Nov. 20, 1934.  W. B. WHITNEY ET AL  1,981,404
ELECTRICAL CIRCUIT BREAKER
Filed Sept. 17, 1931    5 Sheets-Sheet 3
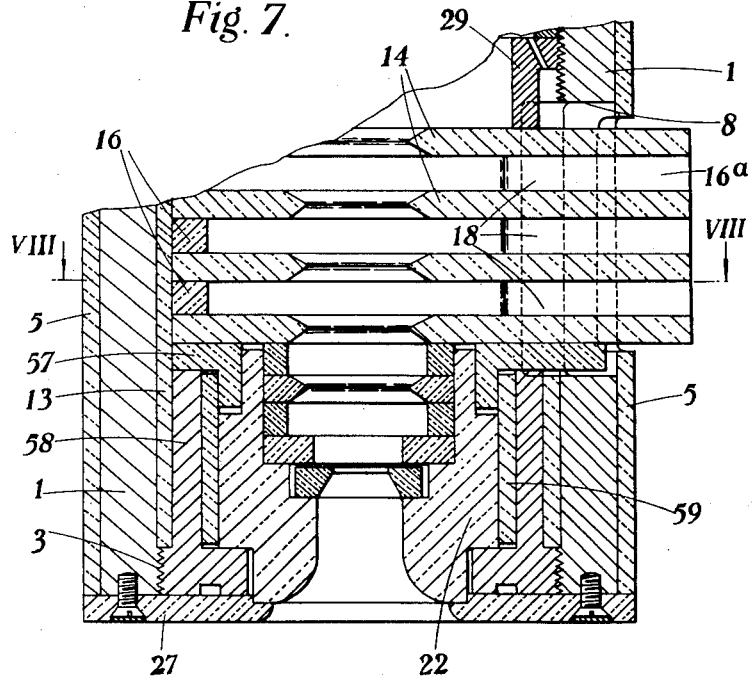
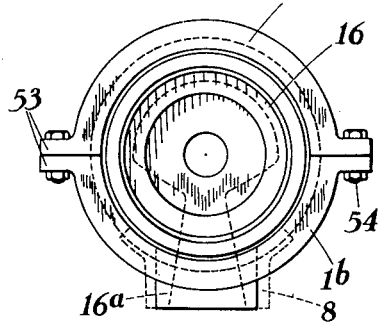
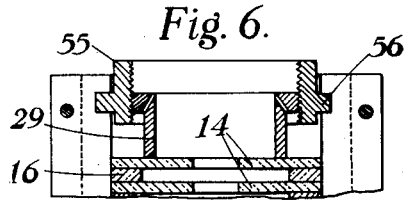
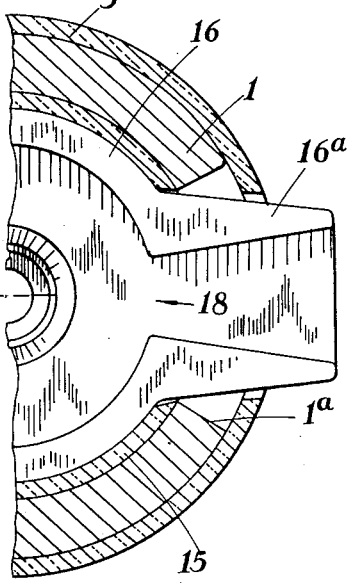
INVENTOR
W. B. Whitney
E. B. Wedmore
BY
Gill & Jennings
ATTORNEYS

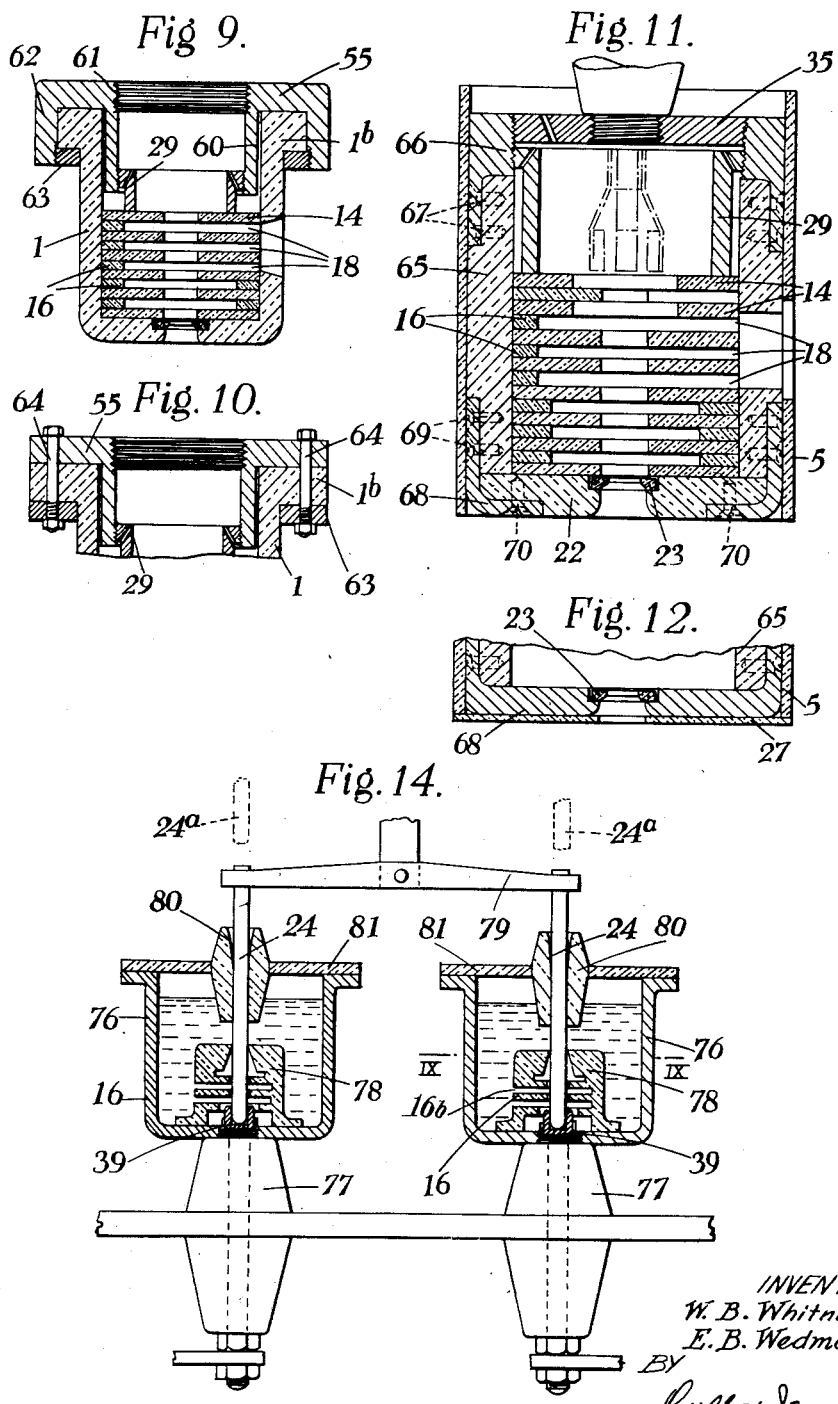

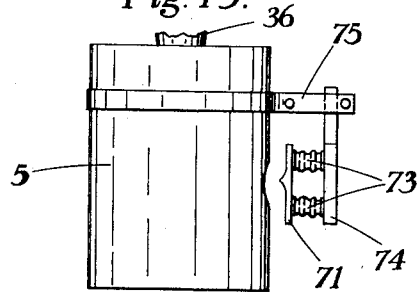
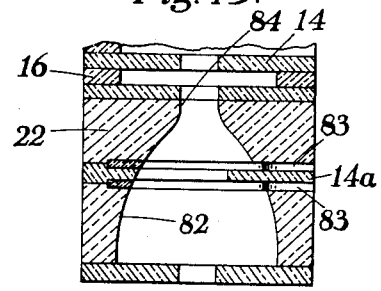
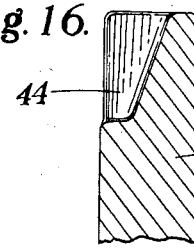
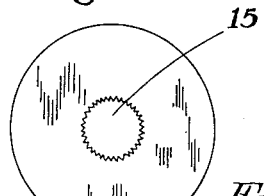
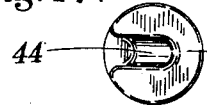
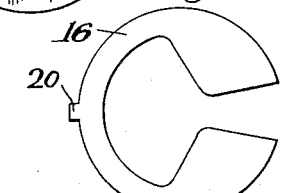
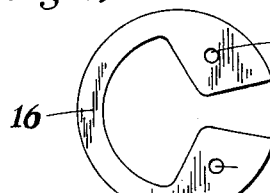
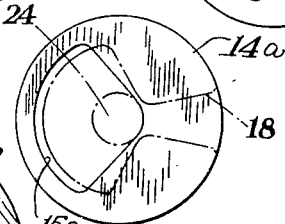
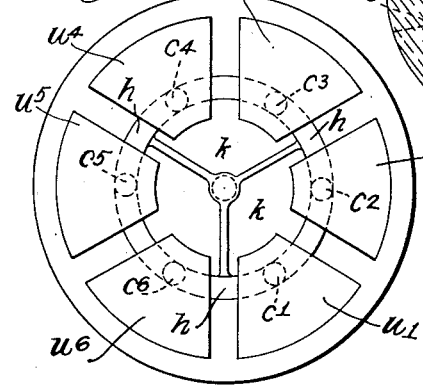
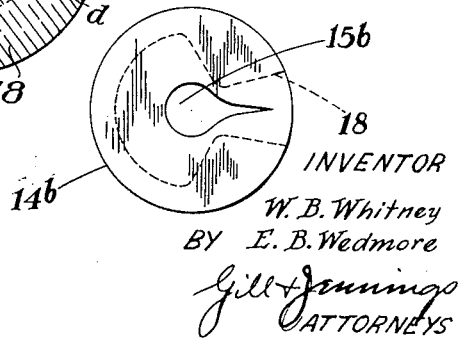

Patented Nov. 20, 1934

1,981,404

UNITED STATES PATENT OFFICE 1,981,404

ELECTRICAL CIRCUIT BREAKER

Willis Bevan Whitney and Edmund Basil Wedmore, London, England, assignors to The British Electrical and Allied Industries Research Association, London, England, a company of Great Britain Application September 17, 1931, Serial No. 563,390
In Great Britain October 15, 1930

31 Claims. (Cl. 200—150)

This invention relates to electrical circuit breakers or switches and like apparatus for rupturing electric arcs and is particularly concerned with circuit breakers for interrupting circuits in which heavy currents flow at relatively high voltages and are broken under the surface of an insulating fluid such as oil or gas.

Many proposals have already been made to employ devices which are commonly known as explosion pots and which consist of enclosed chambers in which an arc is formed upon separation of switch contacts and consequently a pressure is set up which generally tends to force the oil out of the pot. In such devices if the switch pin which forms the moving contact member fits tightly in a guiding passage in the floor of the pot as is usual the oil can only escape and exert its force upon the arc after the moving contact has actually left the explosion pot. It is also known in electrical circuit breakers to provide a free vent for the release of the products of arcing in the neighbourhood of the arc set up when the contacts are separated and also to cause liquids and gases and mixtures of liquid and gas to travel at high velocity into and across the arc path.

It is the chief object of the present invention to provide constructions of circuit breakers of the kind referred to which provide some or all of the advantages of the forms of construction already known and referred to above, in that the invention aims at providing a free vent for the products of arcing and the gases or liquids or both are caused to flow into and across the arc path so as to assist de-ionization and to prevent re-forming of the arc after passing through the condition of zero current.

This object is achieved by arranging for escape of the products of arcing, formed upon separation of electrodes in the circuit breaker structure, to take place through one or more outlet passages in the wall of the structure each extending transversely to the path of electrode separation and leading laterally from this path or from a point in the immediate neighbourhood of that at which arcing commences, the cross-sectional area of the outlet or outlets preferably decreasing continuously in the direction of the opening stroke of the movable electrode. The outlet passage or passages in this way provide a vent through which the products produced by the arc escape from the structure owing to the pressure generated within the structure itself by the arc. Undue elongation of the arc at heavy current may be prevented by causing the blast set up by the internal pressure to force the arc towards the outlet passages, which are so small that the arc can only elongate round about the time of zero current. This arrangement gives the breaker adequate rupturing capacity with relatively small currents and also sufficient strength to resist the forces developed when the largest currents are interrupted.

In order that the invention may be clearly understood and readily carried into effect some examples of construction of circuit breakers in accordance therewith will now be described with reference to the accompanying drawings, wherein:—

Figure 5 is a plan view to a reduced scale of an alternative construction, and

Figure 6 is a central vertical section of the upper part of Figure 5 taken along the plane of the joint between the two halves;

Figure 1:
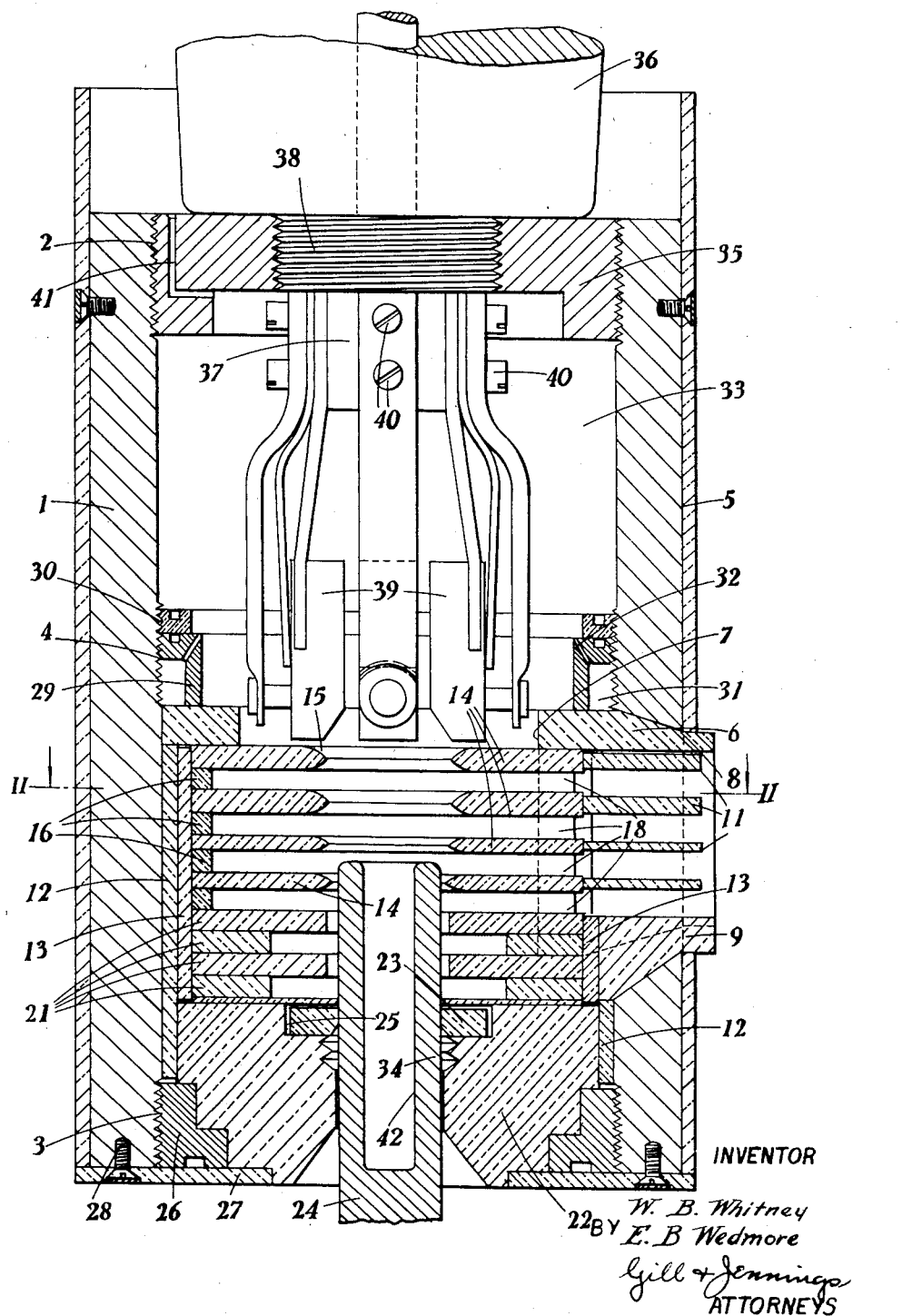
Figure 1 is a central vertical section taken through the centre line of the outlet apertures of one unit of the switch according to one construction.

Figure 7 a central vertical section corresponding to the lower part of Figure 1 of an alternative construction, and Figure 8 is a part horizontal section on the line VIII—VIII in Figure 7;

Figure 9 is a central section to a reduced scale showing a construction in which the wall of the container is of moulded insulating material;

Figure 10 is a central vertical section corresponding to the upper part of Figure 9 showing a slight modification;

Figure 11 is a central vertical section showing a form of construction in which the larger part of the cylindrical wall of the container is of insulating material, for example varnished paper;

Figure 12 is a central sectional elevation corresponding to the lower part of Figure 11, showing a modification of the construction;

Figure 13 is an elevation to a reduced scale of one unit showing means of neutralizing the effect of the lateral thrust due to the escaping arc products;

Figure 14 is a sectional elevation of the two units in one phase of a modified form of construction;

Figure 15 is a central vertical section showing a modification of the construction of the lower portion of a unit particularly suited for dealing with low currents;

Figure 16 is a central section of the upper portion of one form of moving switch pin or moving contact;

Figure 17 is a plan of same;

Figure 18 is a central section of a further form of moving contact;

Figures 19 and 20 are plans showing one configuration of the baffle plates employed with the lateral outlets;

Figures 21 to 23 are plans showing different forms of the intervening or intermediate plates without lateral outlets.

Figure 24 is an enlarged sectional plan of a modification of Figure 14, corresponding to a horizontal section on the line IX—IX in Figure 14; and Figure 25 is a diagrammatic plan view of a number of switch units grouped together.

Figure 2:
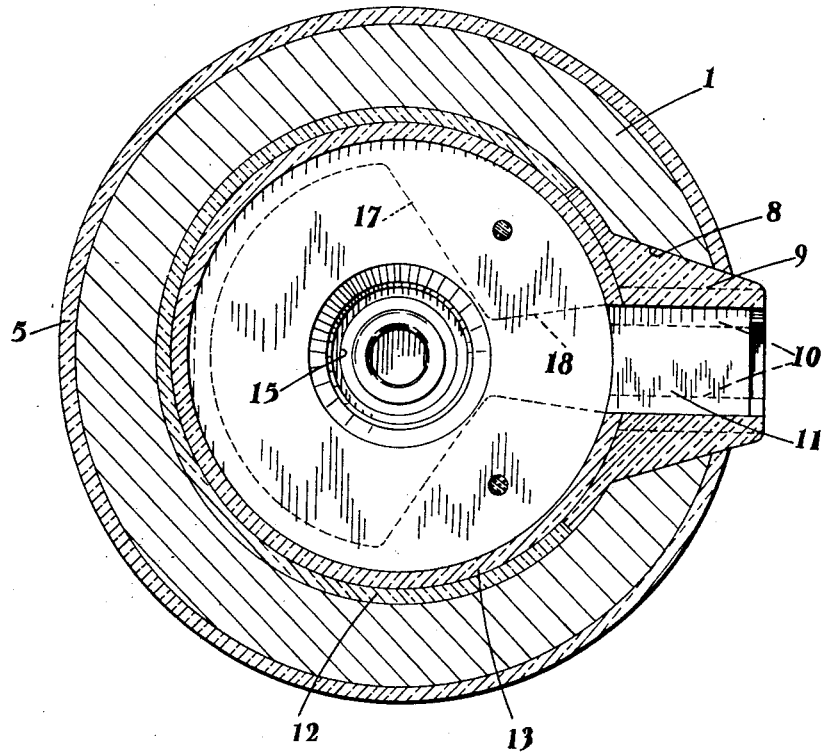
Figure 2 is a horizontal cross section on the line II—II in Figure 1.
Figure 3:
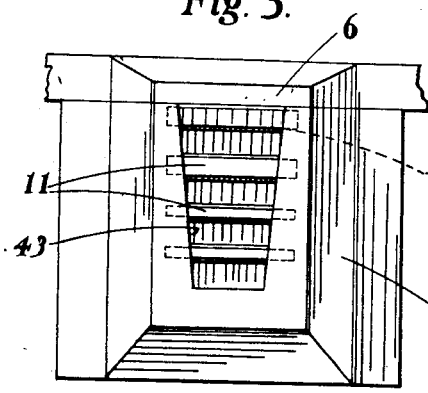
Figures 3 and 4 are elevations, seen from the right of Figure 1, of the part of the casing immediately surrounding the outlet apertures.
Figure 4:
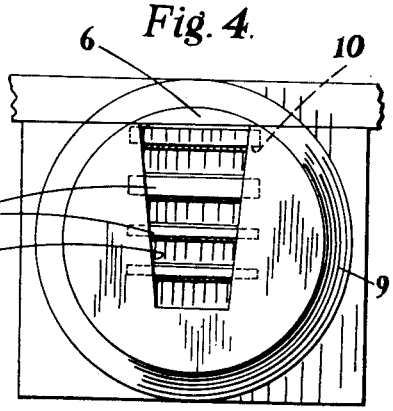

Referring first of all to Figures 1 to 4 of the drawings, the casing of the unit illustrated consists of a thick cylinder 1 of gun metal screw threaded internally at 2 near the top, at 3 near the bottom and at 4 over a portion near its middle height. The cylinder is encased in insulating material 5, such as the insulating material sold under the registered trade-mark "Bakelite", or consisting of varnished paper in order to provide better insulation for the metal parts of the unit from any other metal parts in the tank in which the unit is submerged and to keep the hot arc products escaping from the outlet from coming into contact with the metal casing. The wall of the casing 1 is cut away on the right in Figures 1 and 2 to form a window or an outlet for the vents in the switch space. Two forms of the outlets are illustrated in Figures 3 and 4 and will be described below.

In assembling the unit of the switch a relatively thick top packing ring 6 with a large central aperture 7 is inserted through the bottom of the casing 1 and projects on the right through the outlet aperture 8 to form the top member of the window frame. The window framing 9 is next placed in position. This consists of an insulating moulding with grooves 10 to receive removable shelves 11. An insulating sleeving or lining 12 is then placed in position from the bottom of the container 1 and then a further inner insulating sleeving 13 containing the baffle plates of the switch is inserted. The baffle plates immediately below the ring 6 consist alternately of plates 14 formed with central openings 15, as seen in Figures 1 and 2, and plates 16 sandwiched between the plates 14 and which are formed with a cut-away portion 17 and lateral outlet passages 18 as indicated in Figure 2. Somewhat alternative shapes for these plates 16 are shown in Figures 19 and 20. In Figure 19 the plates each have two drilled holes 19 through which threaded rods are passed to assemble the plates and maintain them properly in register. In Figure 20 the baffle plates are provided on their rear surfaces with splines 20 for which a suitable keyway may be provided in the sleeve 13 so that the baffle plates may be maintained in correct register. Below the baffle plates 16 there are further plates 21 with central apertures alternately small and large in diameter, and finally a base member 22 of insulating material is placed in position and contains a gland 23 of vulcanized fibre fitting closely around the movable switch pin 24 but capable of a small lateral movement in a circular recess 25 in the top of the base member 22. The gland 23, as can be seen, is slightly smaller in diameter than the recess and slightly less in depth so that it can adapt itself in position to the switch pin 24. The base member 22 is held in position by a screwed metal ring 26 which engages in the screw threaded portion 3 of the inner wall of the casing 1 and is screwed in position by a suitable key. Finally, the ring 26 is enclosed by a shallow disc 27 of insulating material held by set screws 28 passing into the gun metal cylinder 1 and having their countersunk heads sealed with insulating material.

The ring 29 is then introduced through the top of the casing 1 and is screwed down tightly into the threaded part 4 of the inner wall of the casing 1 so as to press on to the upper packing ring 6 to hold the baffle plates 14, 16, 21 firmly in position and is then secured by a locking ring 30.

The baffle plates 14, 16 and 21 are of insulating material for example, of vulcanized fibre, teak impregnated with oil or of the stone-like asbestos composition sold under the trade name "Sindanyo" or of any other suitable insulating material. The shelves 11 in the window frame are each at the same level as one of the baffle plates 14 and form an extension of the baffle plates with the function of guiding the arc products through the lateral outlets. The shelves 11 are shown somewhat thinner than the plates 14 as it is not easy to adjust the plates and the shelves to exactly the same level and it is not desirable to provide any ledge or shoulder which will provide an obstruction to the outward lateral flow of the products of arcing. However, if the plates 14 and the shelves 11 are adjusted accurately to the same levels they may be all made of the same thickness. It will be appreciated that the four baffle plates 14 with the four plates 16 which may all be made of the same thickness provide four flat or shallow chambers with lateral outlets of the outline shown in Figures 2, 19 or 20 through which the arc products can flow under the pressure set up due to the formation of an arc when the contacts of the switch are separated.

The ring 29 which is screwed down to hold the baffles firmly in position is shown formed with an annular space 31 between it and the inner wall of the container 1 and the space 31 is in communication, by means of seep holes 32, with the main space 33 within the container 1 and above the baffle plates. Oil from the space 33 can therefore pass slowly through these holes and fill up the annular space 31 so that when arcing takes place this oil is forced out around the window frame 8, 9 thus increasing the insulation between any hot gases and the wall 1 of the container. The outlet passage through the base member 22 below the gland 23 is shown grooved or corrugated at 34, and although this is not necessary when the gland 23 is used, it is of advantage when no gland is provided as it helps to prevent escape of oil.

The top of the casing 1 is closed by a cover 35 also of gun metal. Before, however, it is screwed into the thread 2 at the top of the inner wall of the casing 1 it is screwed on to the main insulator 36 of the unit and to the upper contacts of the switch unit. The current lead-in through the insulator 36 has a metal extension 37 screw-threaded at its upper part at 38. The cover 35 is screwed on to the thread 38 and the upper switch contacts are of known form consisting of fingers 39 fixed by screws 40 to the lead-in extension 37 through the insulator. When the parts are assembled the casing 1 is screwed on to the cover 35 and may be locked in position, if desired, by grub screws which are not shown. Similarly the cover 35 may be locked to the threaded portion 38 by one or more grub screws. The cover 35 is formed with a fine passage 41 which serves as a gas leak so that after an arc has been broken any gas trapped in the space 33 can escape and oil can refill the space ready for the next closing operation. Three per cent of the total outlet throat area of the side venting outlets may be taken as a rough guide to the maximum seep hole area. The seep hole or holes should be so arranged that no direct path is provided for escaping oil.

When the circuit is being broken, the lower contact 24 which is actually the moving switch pin is moved downwards by means of a cross bar attached to its lower end and not shown so that an arc is formed between its tip and the upper contact fingers 39. The arc and the products of arcing set up a pressure within the container between the baffle plates 16. The pressure causes lateral projection of the products of arcing across the contact tip through the outlets 18 between the shelves 11 and as the contact 24 moves down, this lateral flow of the arcing products results in extinction of the arc; finally in order to provide a satisfactory seal the moving contact is removed completely out of the casing through the gland 23.

In a particular construction for a three phase double break single tank oil circuit breaker, the six breaks or units are of the construction shown in Figures 1 and 2, the gun metal cylinder 1 being five inches in external diameter and three and seven-eighths inches internal diameter. The outer insulating sleeve and the inner insulating lining consist of varnished paper one-eighth of an inch thick. The capacity of the boiler plate oil tank in which the gun metal cylinders are immersed, may for example be five and a half cubic feet including about a half cubic foot air cushion. The thickness of the walls of the tank may be half an inch and its upper edge may be strengthened by a seven-eighths inch thick flange projecting inwardly one inch, and welded barriers three-eighths inch thick may be provided projecting inwardly from the walls between phases. The speed of movement of the cross bar carrying the switch pins 24 is five feet per second approximately. The total vent pipe outlet area is 0.8 square inches. The arcing distance through the stack of baffle plates 14, 16 and 21 between the bottom of the fixed contacts 39 and the close fitting gland 23 is two and a quarter inches. In this example there are four parts of the gas outlet throat of different widths, each three-sixteenths of an inch deep, and widths of one and a quarter, one, three-quarters and a half inch respectively in order downwards. The moving contact pins 24 are seven-eighths of an inch in diameter with the central hole 42, which will be referred to below, of a quarter of an inch diameter. It is found that the construction is satisfactory when the baffle plates 14, 16 and 21 are either made of wood impregnated with oil or of vulcanized fibre. A circuit breaker constructed in this way has successfully withstood severe conditions of recovery voltage when interrupting a power of approximately half a million kilovolt-amperes 3-phase at an initial potential of 22 kilovolts and it has also withstood a British Electrical Standards Association duty cycle test, including opening the circuit breaker on four hundred thousand kilovolt amperes; closing it again on over three-quarters of a million kilovolt amperes and opening it again on four hundred and fifty thousand kilovolt amperes. It is found that the average duration of the arc in such a switch in test such as the above is less than one cycle at a frequency of 40 cycles.

The window frame 6, 9 may be of moulded "bakelite" or other moulding composition and is shown in Figures 3 and 4 with a slightly tapered opening 43, the shelves 11 being somewhat slightly wider than this opening. The provision of shelves 11, however, is not absolutely necessary, and if they are not used it is preferable for the top packing ring 6 to be sunk slightly into the window frame 9 so as to wedge this frame laterally and thus avoid any tendency for it to crack. Moreover, the part of the window frame which supports the shelves 11 may be made separately from the rest of the frame to facilitate dismantling or changing of the shelves.

In Figure 3 the window frame is shown rectangular to fit into a rectangular aperture in the wall of the gun metal cylinder 1. However, in Figure 4 the general outline of the frame is shown as conical, the aperture in the wall of the casing 1 being circular. This enables the hole through the wall of the casing 1 to be made by a simple turning operation. To facilitate the machining of this hole, the container 1 may have a boss cast upon it around the point at which the hole is to be cut, and this boss may be finally turned off after the conical hole to receive the window frame 9 has been machined.

In Figure 1, as already mentioned, the moving switch pin or lower contact 24 is cylindrical in shape, but is hollow down the centre as shown at 42, the object being that the arc is kept to the edge of the contact 24 where it is in close contact with the mass of oil.

Other forms of contact may, however, be employed of solid, circular, square, rectangular or other cross-section moving through similarly shaped central apertures 15 in plates 14. Thus, as shown in Figures 16 and 17 the point of the contact 24 is formed with a cut-away portion at the back at the point 44 for some distance from the tip so as to allow the oil to come as close to the arc as possible. In the form illustrated in Figure 18, the bore 42 of the contact 24 is enlarged lower down as seen at 45, the enlarged bore 45 being closed at the lower end by a screwed-in plug 46. There is a tubular thimble or ferrule 47 making a tight fit within the enlarged bore 45 and of a shape leaving an annular space 48 around it in which air is entrapped when oil enters the contact from the top. As a result, in this case, when the contact 24 descends there is no tendency to set up a vacuum within the bore of the contact and therefore since the contact 24 moves downwards faster than the oil within it falls under gravity, the oil imprisoned in it may more easily leave the contact and fill up the space left above the latter.

In connection with the constructions shown in Figures 1, 2, 5 to 11, 14 and 15, it is desirable in some cases not to employ the intermediate plates 14 with a circular central hole. Thus, in Figure 21, the plate 14 has a central aperture 15 which as shown is formed with serrations around its edge to retain oil to protect the solid surface from the heat of the arc. In a particularly recommendable form of construction shown in Figure 22, the plate 14a has the aperture 15a enlarged at the back of the moving contact—indicated at 24—to allow greater freedom of access of the oil to the arc gap. Again, in Figure 23, the plate 14b has the centre aperture 15b extended to the right in the direction of the lateral outlet 18. The extension may reach the throat or as in Figure 23 may extend beyond it. A similar lateral extension in the baffle plates may be employed when the aperture is rectangular or square to accommodate a moving switch pin of a smaller section. The effect of the lateral extension is to produce a tendency to displace the arc further into the mouth of the baffles 16 either to or beyond the throat according to the length of the slot so that the arc may be more fully subjected to the blast in the first case or may be cooled by expansion of the gas if carried beyond the throat. The size and configuration of the cross-section of the moving contact and of the hole such as 15b may be made to depend upon the magnitude of the current, cross section of contact and area of hole may, for example, be smaller the smaller the maximum current which has to be broken by the breaker.

A form of construction is illustrated in Figures 5 and 6 in which the container is formed in two equal halves 1a and 1b. The halves are formed with meeting flanges 53 held together by means of bolts 54 passing through them. The baffle plates 16 may then be formed in one with projecting noses 16a and may fit snugly in the hole 8 in the wall 1b of the container. These baffles may be placed in position with the half 1a of the casing removed and when they are all in position the back part 1a of the casing may be placed in position and fastened by the bolts 54. In this construction also a window frame of insulating material may be provided to increase the insulation around the lateral outlets. The upper most baffles 14 and 16 are seen in Figure 6 and the ring 29 as in Figure 1 holds these baffles in position. It would be difficult for this ring to screw directly into the parts 1a, 1b of the casing as the parts of the thread on the two halves would be difficult to place in exact registration when the two halves of the casing are bolted together. To avoid this difficulty a short tubular member 55 internally screw threaded and formed with an outer annular rib 56 is employed which is placed in position with the rib 56 in a groove in the casing before the removable part 1a is placed in position and it is then locked in position by fastening the halves 1a in position in turn. The ring 29 is screwed into the inside of the section 55 and the cover plate of the switch may also be screwed into the top of the section 55.

A form of construction of the novel switch unit is illustrated in Figures 7 and 8 in which the baffle plates 14 and 16 extend through the aperture 8 in the casing 1 and have no separate window frame. Such a construction is particularly suitable when low voltage circuits have to be interrupted when insulating around the window is not as important. As can be seen the hole 8 in the container 1 is made larger than the space taken up by the baffle plates 14, 16 to facilitate the placing of these baffle plates in position and particularly the plates 16 with their projecting noses 16a. The baffle plates 14 and 16 are held in position by an upper ring 29 shaped as in Figure 1 and by a lower ring 57. The latter in turn is held in place by a metal tube 58 screwed into position at 3 into the lower end of the container 1. An insulating lining 13 contains the baffle plates 14 and 16 and fits around the greater part of the tube 58. A further insulating lining 59 fits within the tube 58 and the latter also holds in position the base member 22 of insulating material. The whole bottom of the unit is enclosed by a disc 27 of insulating material in a manner similar to that shown in Figure 1. The sleeve of insulating material enclosing the whole container is shown at 5 and is similar to that shown in Figure 1. It will be noted from Figure 8 that the metal container 1 is cut back at 1a at the edges adjacent the noses 16a of the baffle plates 16 in order to reduce any tendency for the arc gases to come into contact with the metal container 1.

A form of construction is illustrated in Figure 9 in which the whole of the casing is made of insulating material such as an insulating moulding composition, for example the moulded material sold under the trade-mark "Bakelite". The upper edge of the container 1 is formed with a flanged rim 1b over which the upper metal section 55 fits. The latter has an inner tubular portion 60 fitting within the container 1 and screw threaded internally at the bottom to receive the ring 29 for clamping the baffles 14, 16 in position and screw threaded at the top at 61 to receive the cover plate of the unit. The metal section 55 also has a depending skirt 62 enclosing the flanged rim 1b and held in position by a ring 63 which seats against the lower surface of the rim 1b and is screwed into the inside of the skirt 62. In other respects the construction is similar to that shown in Figure 1. Figure 10 illustrates a construction very similar to that shown in Figure 9 except that the section 55 is held in position by bolts 64 which pass through the flange of this section and through the rim 1b and through the seating ring 63.

In the form of construction shown in Figure 11 the container consists largely of a cylindrical member 65 of varnished paper. The construction of the baffles 14 and 16 is much the same as before and they are held in place by an upper ring 29 and by a base member 22, which latter supports the gland 23 much as in Figure 1. The ring 29 is screwed into the inside of a metal extension 66 of the cylinder 65 fixed to the latter by grub screws 67. The cover plate 35 is also screwed into the metal extension 66. A metal cap 68 is also provided at the bottom fixed to the cylinder 65 by grub screws 69 and this also retains the base member 22 in position to which it is secured by grub screws 70. The whole of the metal parts are encased in an insulating sleeve 5 similar to that shown in Figure 1. In Figure 11 the lower cap 68 does not extend as far as the gland 23 but is quite clear of the latter. In Figure 12 there is a slight modification in which the metal cap 68 extends inwardly actually to support the gland 23 directly. The member 68 is then covered in by a disc of insulating material 27. The construction shown in Figure 12 is permissible when the metal parts are well clear of the window outlet in the cylinder 65 or are in such a position that the arc gases cannot come into contact with them.

In all the forms of construction so far dealt with, the unit is suspended from the current lead through the top insulator 36 shown in Figure 1. If any undue stress is likely to be imposed upon the insulator due to the reaction of the arc products leaving by the lateral apertures 18, arrangement for avoiding this may be used as diagrammatically illustrated in Figure 13. A reaction plate 71 is placed just outside the window outlet 72 in such a way or of such a shape that the escaping arc products are not unduly impeded and is carried on insulators 73 extending from a bracket 74. The latter extends downwards from a metal clamp 75 which surrounds the insulating sleeve 5 of the whole unit and is clamped to it. Pressure due to the arc products escaping through the window outlet 72 acts upon the reaction plate 71 and merely tends to force that and the container apart and therefore does not impose any stress upon the insulator 36.

The invention is not of course limited to arrangements in which the moving contact pin 24 moves downwardly, nor in fact to any arrangement in which the unit is arranged vertically. The moving contact 24 may move at any angle or may even move vertically upwards. The last mentioned arrangement is particularly suitable for a switch in which water or other fluid which is not a perfect insulator is employed; such an arrangement is illustrated in Figure 14. This figure illustrates the two breaks in one phase of the system. Each break is arranged within a metal container or pot 76 supported upon an insulator 77 and carrying within it at the middle of its bottom wall a fixed contact 39. A structure of insulating material 78 is mounted on the bottom wall of the container 76 around the fixed contact 39 and in the example illustrated is formed with a single baffle 16 providing two flat chambers with lateral outlets. The moving contacts 24 in this case are carried upon a cross bar 79 of conducting material and are moved upwardly to break the circuit. Each moving contact is guided in an insulating bushing 80 mounted centrally in the cover 81 of the container 76 which is bolted on to a flange of the latter and may be of insulating material or metal with insulating lining, not shown. The contacts are lifted until they are entirely removed from the containers 76 and take up the position indicated in dotted lines at 24a, in order to insulate the terminals from the liquid after the arc has been ruptured. The outlets 16 may point in opposite directions relatively to each other.

A form of construction is illustrated in Figure 15 particularly adapted for dealing with the interruption of relatively small currents at high voltage. This figure shows a modified form of the lower part of a unit otherwise similar to that shown in Figure 1. The base member 22 below the baffles 14 and 16 is made deeper and formed with a bell-shaped chamber 82. It is formed in sections with rings with lateral outlets and with a baffle plate of the type shown in Figure 22 between them, but having the back of the aperture flush with the back of the bell-shaped chamber so that there are, in the particular example illustrated two outlets 83 on the right of Figure 15 of restricted dimensions each of which may have a smaller outlet area than provided by any outlet in the upper casing. In such a case when small currents are interrupted arcing may continue until the top of the moving contact comes into the chamber 82 when the gases expand and tend to force oil out of the throat 84 which is thus choked and sufficient pressure is set up with a side blast through the smaller openings 83 in order finally to extinguish the arc.

In circuit breakers for use with baffles of the type herein described care should be taken to provide adequate guiding means to keep the cross bar on an even keel to prevent the possibility of jamming in the event of uneven pressures in the various baffle pots when operating on very high powers.

The insulating members may be made of other material than moulded "bakelite" or varnished paper such as vulcanized fibre and the like. However, moulded insulating materials of the synthetic resin class have the advantage that they are not liable to flake or split. The baffle plates 16 may be varied in shape to a considerable extent. The outlet apertures 18 may be made with parallel sides as shown in Figure 2 or with divergent sides as shown in Figures 19 and 20, and the dimensions of the outlets may be varied in accordance with the power of the circuit to be interrupted.

In one arrangement with which numerous successful tests have been carried out, the insulating structure within which the arc was ruptured was built up of superimposed plates of oil-soaked teak, while the outlets in this case were all of the same throat width.

Figure 24 shows, in section, an enlarged plan view of a modified form of construction of one of the breaks illustrated in Figure 14. The modification consists in providing a number of cavities $a, b, c, d$ and so forth of different lengths, each extending from the top arcing chamber 16b. These cavities may be made by drilling holes communicating with the top chamber and extending various distances into the insulating switch structure 78, care being taken that the ends of the cavities remote from the arcing chamber are closed, so that a certain amount of gas becomes imprisoned in them. Thus, during arcing the oil and gas will be forced into these small chambers and surge back so increasing the lateral blast effect due to the pressure set up. The cavities $a, b, c, d$ are made of different lengths so that the rebounding of the gas and oil spray or oil will take place at different times in each cavity, thus increasing the chance that one of them will be discharging into the arc path at or about the time of occurrence of zero value in the current wave when alternating current is being interrupted.

Figure 25 shows, in plan, how six switch units $u_1, u_2 \ldots u_6$ may be arranged in the case of a three-phase switch with a double break in each phase. These units, which may be in accordance with any of the forms of construction described above, are all contained in a single oil tank $t$ and are arranged symmetrically on the circumference of a circle. The movable electrodes are shown at $c_1, c_2 \ldots c_6$ and are mounted on a common yoke or cross-bar $h$ supported on arms $k$, the electrodes belonging to the different phases being adequately insulated from one another. Each unit may have one or more lateral outlets for the escape of products of arcing, the direction of discharge through these outlets being indicated by the arrows. The lateral outlets are preferably made so small, in the direction of electrode separation, that the arc in each unit can only elongate round about the occurrence of zero current. It will be appreciated that, as the discharge paths for the arc products are directed away from each other, there can be no danger of them setting up short-circuits between phases.

We claim:—

1. An electric circuit breaker comprising in combination, a container for fluid, a switch structure supported in said container and at least partly immersed in said fluid and formed with an internal switch chamber, the wall of which is formed with an outlet passage unsymmetrically placed with respect to the axis of said switch chamber, relatively-movable electrodes mounted in said structure and a reaction plate insulated from said electrodes and rigidly attached to said switch structure in front of but clear of the unsymmetrically placed outlet passage in order to counter-balance the lateral pressure due to the escape of arc products from said switch chamber through said unsymmetrically placed outlet passage.

2. An electric circuit breaker, comprising in combination, a container for liquid, a structure supported therein and at least partly immersed in said liquid, relatively movable electrodes located within said structure and also at least partly immersed in said liquid, said structure being formed with a shallow internal chamber and substantially enclosing the arc gap formed upon separation of said electrodes so that at least a part of the length of said arc gap is surrounded by a continuous body of said liquid, the wall of said structure being pierced with one or more outlet passages in addition to those required to allow of the movement of one of said electrodes, said passages being unsymmetrically placed with respect to said electrodes and at least one of said passages leading from the vicinity of the point at which arcing commences upon opening of the circuit breaker so that the outlet passage or passages provide one or more vents through which products formed by the arc escape from said structure, generally in one direction transversely to the direction of electrode movement for each of such vented chambers, due to the pressure generated within said structure itself by the arc, and a gland plate mounted in said structure so as to be capable of lateral movement and having an aperture closely fitting said movable electrode in order to minimize the escape of fluid.

3. An electric circuit breaker, comprising in combination, a container for oil, a structure supported within said container and at least partly immersed in and filled with said oil and formed with an internal switch chamber, relatively movable electrodes mounted in said switch chamber and also immersed in said oil, a plurality of transverse baffle plates secured in said structure and dividing said switch chamber into a plurality of shallow chambers and a clamping member secured in said structure and adjustably applying pressure to hold said baffle plates in position, the wall of said structure being pierced by a plurality of unsymmetrically placed separate outlet passages from and in communication with some or all of said shallow chambers and at least one leading from the vicinity of the point at which arcing commences so as to provide ready vent paths through which products formed by the arc, are able rapidly to escape from the switch chamber generally in one direction transversely to the direction of electrode movement for each such vented chambers, due to the pressure generated in the chamber itself by the arc.

4. An electric circuit breaker comprising in combination, a switch structure formed with an internal switch chamber containing liquid, the wall of said chamber being formed with a lateral outlet aperture, and relatively movable electrodes mounted in said switch structure and also immersed in said liquid, one of said electrodes being slidably mounted in said structure and formed with a cut-away portion at the back for some distance from its arcing surface.

5. An electric circuit breaker, comprising in combination, a structure containing liquid, relatively movable electrodes located within said structure and also at least partly immersed in said liquid, one of said electrodes being adapted to move through an outlet passage from said structure, said structure being formed with an internal chamber also containing said liquid and substantially enclosing the arc gap formed upon separation of said electrodes so that at least a part of the length of said arc gap is surrounded by a continuous body of said liquid, the wall of said structure being of metal and of sufficient strength to resist the pressure generated by the arc products and being formed with an outlet passage in addition to those required to allow of the movement of one of said electrodes, said passage being placed with respect to said electrodes and leading from the vicinity of the point at which arcing commences upon opening the circuit breaker so that the outlet passage provides a vent through which products formed by the arc are able rapidly to escape from said structure due to the pressure generated within said structure itself by the arc, and a frame or bushing of insulating material fitted within an aperture in said metal wall and shaped so that said outlet passage passes through said frame.

6. An electric circuit breaker comprising in combination, a structure formed with an internal switch chamber containing liquid, the wall of said structure being of metal and provided with a lateral aperture of cross-section decreasing outwardly, a removable frame of insulating material, wedge-shaped and fitted within said lateral aperture and formed with passages leading from said switch chamber to the outside of said structure, and relatively movable electrodes enclosed in said switch structure and also at least partly immersed in said liquid.

7. An electric circuit breaker comprising in combination, a switch structure formed with an internal switch chamber containing fluid, the wall of said chamber being provided with a lateral outlet aperture, a plurality of transverse baffle plates subdividing said switch chamber into a plurality of shallow chambers, a frame or bushing of insulating material fitted in said lateral aperture and formed with shelves or partitions registering with said baffle plates and furnishing a number of separate passages connecting said shallow chambers with the outside of said switch structure, and relatively movable electrodes enclosed in said switch structure and also at least partly immersed in said fluid, one of said electrodes being mounted to move through said baffle plates.

8. An electric circuit breaker, comprising in combination, a structure formed with an internal switch chamber containing oil, relatively movable electrodes mounted in said switch chamber and also immersed in said oil, a plurality of transverse baffle plates secured in said structure and dividing said switch chamber into a plurality of shallow communicating chambers, and a clamping member secured in said structure and adjustably applying pressure to hold said baffle plates in position, the wall of said structure being formed with an opening communicating with a plurality of unsymmetrically placed outlet passages in communication with said shallow chambers and leading from the vicinity of the arc path in each such vented chamber so as to provide ready vent paths through which products formed by the arc are able rapidly to escape from the switch chamber due to the pressure generated in the chamber itself by the arc, said baffle plates being shaped so as to be removable as a single unit through one end of said structure.

9. An electric circuit breaker comprising in combination, a switch structure containing oil, relatively movable electrodes mounted in the space within said structure and also immersed in oil, and one of which is movable through an aperture in an insulating plate or bushing at the bottom of the switch structure, the space within said structure forming a switch chamber containing oil and substantially enclosing the arc gap formed upon separation of said electrodes so that at least a part of the length of said arc gap is surrounded by a continuous body of oil, the wall of said structure being formed with one or more outlet passages unsymmetrically placed with respect to said electrodes and at least one of said passages leading from the vicinity of the point at which arcing commences upon opening of the circuit breaker to the outside of said structure, and a casing of insulating material enclosing said structure and having apertures registering respectively with the moving electrode and with at least one of said outlet passages.

10. An electric circuit breaker, comprising in combination, an insulator, a casing supported on said insulator and formed with an internal switch chamber containing liquid, relatively movable electrodes mounted to separate within said switch chamber and also immersed in said liquid, a plurality of transverse baffle plates in said casing, an adjustable clamping member secured in said casing to hold said baffle plates in position, and a locking device for securing said clamping member when adjusted, the wall of said casing being pierced by a plurality of separate outlet passages extending transversely in one general direction from the arc gap formed upon separation of said electrodes and at least one leading from the vicinity of the point at which arcing commences so as to provide a ready way of escape for products of arcing in one general direction transverse to the direction of electrode movement.

11. An electric circuit breaker, comprising in combination, a structure formed with an internal switch chamber containing liquid, and relatively movable electrodes mounted to separate in said switch chamber and also immersed in said liquid, the wall of said structure being pierced by a plurality of superposed lateral outlets leading in one general direction from the arc gap formed upon separation of said electrodes to the outside of said structure, said outlets being of greatest width near the position where arcing commences and narrowing in the direction of the position at which the electrodes are fully separated.

12. An electric circuit breaker, comprising in combination, a structure formed with an internal switch chamber containing fluid, and relatively movable electrodes mounted to separate in said switch chamber and also immersed in said fluid, the wall of said structure being pierced by a plurality of superposed lateral outlets leading in one general direction from the arc gap formed on separation of said electrodes to the outside of said structure, said outlets having a cross-section which is narrow close to the path of separation of said electrodes and which increases outwards.

13. An electric circuit breaker, comprising in combination, a switch structure, relatively movable electrodes mounted to separate within said structure, said structure being formed with a switch chamber containing liquid and substantially enclosing the arc gap formed upon separation of said electrodes, and a baffle plate of insulating material dividing said switch chamber into a plurality of chambers at least one of which is in communication with the outside of said structure, said structure being formed with cavities of different lengths communicating with one of said chambers and in which products of arcing can surge at different natural frequencies in order to assist extinction of the arc.

14. An electric circuit breaker, comprising in combination, a switch structure formed with an internal switch chamber containing liquid, and relatively movable arcing electrodes arranged to separate within said switch chamber, one of said electrodes which is movable being formed with a central bore open only at the arcing tip and containing a gas trap to and from which said liquid can flow under pressure from said switch chamber across said arcing tip during arcing.

15. An electric circuit breaker, comprising in combination, an insulator, a cylindrical metallic switch casing containing liquid and mounted on said insulator, relatively movable electrodes mounted with their arcing surfaces within said casing, an insulating base member closing the bottom of the switch casing formed with an aperture through which one of said electrodes can move, a metal ring for holding said base member securely in place, the wall of said casing being pierced with at least one outlet passage extending transversely in one general direction from the vicinity of the arc gap formed upon separation of said electrodes to the outside of said casing, and a covering of insulating material enclosing said casing and having apertures registering respectively with one of said electrodes and with at least one of said outlet passages.

16. An electric circuit breaker, comprising in combination, a casing formed with an internal switch chamber containing liquid, relatively movable electrodes mounted with their arcing surfaces in said switch chamber and also immersed in said liquid, a plurality of transverse baffle plates secured in said casing, the wall of said casing being pierced by at least one outlet passage extending transversely in one general direction from the arc gap formed upon separation of said electrodes, said casing being composed of insulating moulding composition, the upper edge thereof being formed with a flanged rim, a metallic member adapted to engage with said rim and formed with an inner tubular portion fitting within said casing and screw-threaded internally at the bottom, and a clamping member screwed into said metallic member and serving to hold said baffle plates in position.

17. An electric circuit breaker, comprising in combination, a cylindrical casing containing liquid, a cylinder of varnished paper forming part of said casing, relatively movable electrodes mounted to separate within said casing, a metallic extension at the top of said casing secured to and partly overlapping said varnished paper cylinder, and a metal cap at the base of said casing also secured to and partly overlapping said varnished paper cylinder, said metal cap having an opening therein to allow passage of one of said electrodes.

18. An electric circuit breaker, comprising in combination, a casing containing fluid, relatively movable electrodes with their arcing surfaces located within said casing and also immersed in said fluid, a structure housed in said casing and having a wall pierced with outlet passages extending transversely in one general direction from the arc gap formed on separation of said electrodes, and an insulating frame secured in the wall of said casing and surrounding said outlet passages to keep the hot products of arcing out of contact with said casing.

19. An electric circuit breaker, comprising in combination, a structure containing liquid, relatively movable electrodes mounted to separate within said structure, the wall of said structure being pierced with an aperture for the escape of products of arcing disposed transversely to the line of electrode separation, and an insulating base member forming the bottom of said structure, said base member being formed with a bell-shaped chamber the throat of which closely encircles one of said electrodes which is movable, the side wall of said chamber being pierced with outlet passages of smaller total cross-sectional area than said aperture, so that low current arcs drawn into said bell-shaped chamber are able to establish sufficient pressure and side blast through said outlet passages for extinction.

20. An electric circuit breaker, comprising in combination, a casing containing liquid and formed in two parts divided along a longitudinal plane, one of said parts being formed with a lateral outlet aperture, relatively movable electrodes arranged to separate in said casing, a plurality of transverse baffle plates in said casing having openings therein through which one of said electrodes can move, at least one of said baffle plates being formed with a slot leading from the opening in said baffle plate to said outlet aperture, a short tubular member internally screw-threaded inserted within said casing, an annular rib projecting on the outside of said tubular member, said casing being formed with a groove for co-operation with said rib, and a clamping member screw-threaded for engagement with the internally screw-threaded portion of said tubular member and serving to hold said baffle plates in position.

21. An electric circuit breaker, comprising in combination, a metallic casing formed with an internal switch chamber containing fluid, relatively movable electrodes mounted with their arcing surfaces in said chamber, the wall of said casing being provided with a lateral outlet aperture, and a plurality of transverse plates with openings therein disposed in said switch chamber and formed with projecting noses extending outwards through said outlet aperture, said metallic casing being cut away at the edges adjacent said projecting noses so as to reduce any tendency for products of arcing to come into contact with said casing during their discharge through said outlet aperture.

22. An electric circuit breaker, comprising in combination, a structure containing fluid, relatively movable electrodes arranged to separate within said structure and also at least partly immersed in said fluid, said structure being formed with at least one internal chamber substantially enclosing the arc gap formed upon separation of said electrodes, the wall of said structure being pierced with one or more outlet passages in addition to that required to allow of the movement of one of said electrodes, said passages extending transversely in one general direction from the arc gap formed on separation of said electrodes so that the oulet passage or passages provide one or more vents through which products formed by the arc escape from the arc path in a concentrated stream at high velocity generally in one direction transversely to the direction of electrode movement for each of such vented chambers, due to the pressure generated within said structure itself by the arc, a metal cap secured to the bottom of said structure and formed with an aperture through which said movable electrode passes, and a gland plate mounted in said metal cap so as to be capable of lateral movement and having an opening closely fitting said movable electrode in order to minimize the escape of fluid between the surface of said electrode and the walls of said opening and aperture.

23. An electric circuit breaker, comprising in combination, a structure formed with a deep internal switch chamber of substantially fan-shaped cross-section and containing liquid, and relatively movable electrodes arranged to separate in said chamber at a small clearance distance from a corner of said chamber formed by two converging walls thereof, the wall of said structure at said corner being pierced by a plurality of superposed outlet passages extending transversely in one general direction from the immediate vicinity of the arc gap formed upon separation of said electrodes.

24. An electric circuit breaker, comprising in combination, a structure formed with an internal switch chamber of substantially fan-shaped cross-section and containing liquid, and relatively movable electrodes mounted in said chamber to separate along a path close to the junction between two convergent walls of said chamber, the wall of said structure at said junction being pierced by a plurality of superposed outlet passages extending transversely in one general direction from the immediate vicinity of the arc gap formed upon separation of said electrodes, said outlet passages being made so small in the direction of electrode separation that the arc can only elongate round about the time of zero current.

25. An electric circuit breaker, comprising in combination, a structure formed with an internal switch chamber containing fluid, relatively movable electrodes mounted to separate in said chamber, and an insulating member separating the upper part of said chamber from the lower part thereof, the wall of said structure and of said chamber being pierced with outlets of large total cross-sectional area and of smaller total cross-sectional area located respectively above and below said insulating member and extending transversely in one general direction from the line of electrode separation, said insulating member having an opening therein through which one of said electrodes passes slidably.

26. An electric circuit breaker, comprising in combination, a structure formed with a deep internal switch chamber containing liquid, two of the sides of said chamber converging laterally, and electrodes mounted in said chamber, one of said electrodes being movable and arranged to move along the corner of the chamber formed by said converging sides, the wall of said chamber being pierced at said corner by a plurality of superposed closely spaced lateral vent passageways formed with throats in the immediate neighbourhood of said movable electrode and widening outwards through said wall to allow expansion of arc gases in escaping through said passageways, the portion of said chamber above said passageways being formed with a seep hole for the slow escape of arc gases, said structure having an aperture in which said movable electrode slides with a close fit in closing and opening the breaker.

27. An electric circuit breaker, comprising in combination, a structure formed with a deep, internal, oil filled chamber having two laterally convergent walls, said chamber being substantially closed at the top and the cross-section of said chamber throughout a substantial portion of its depth approximating to the shape of a sector of a semi-circle, said structure being pierced by a plurality of superposed closely spaced lateral passageways extending from the corner formed by said two convergent walls and providing a series of vents from the chamber, a fixed electrode in the upper part of said chamber, and a movable electrode for co-operating with said fixed electrode, the bottom of said chamber having an aperture in which said movable electrode slides with a close fit, said movable electrode being positioned in said chamber at a small clearance from the entrances to said lateral passageways, the narrowest part of one of said passageways near said fixed electrode being wider than the narrowest part of another of said passageways passed by the tip of said movable electrode during the opening movement of the latter.

28. An electric circuit breaker, comprising in combination, a structure formed with a fluid filled chamber, the wall of said structure being pierced by a plurality of closely spaced superposed lateral passageways allowing escape of the arc products from said chamber, and relatively movable electrodes separable in said chamber, at least two of said passageways which are adjacent to each other having a throat portion and an outwardly widening vent portion allowing expansion of escaping arc gases, the portion of said structure between said two passageways being provided with a slot narrowing from the path of separation of said electrodes towards the outside of said structure and terminating on the outlet side of the throat portions of said two passageways.

29. An electric circuit breaker, comprising in combination, a structure containing liquid, a fixed electrode and a movable electrode separable within said structure and liquid, a barrier in said structure separating the interior of said structure into two chambers, one of which contains said fixed electrode, said barrier having an opening therein in which said movable electrode moves with small clearance to make contact with said fixed electrode in the closed position of the breaker, the wall of said structure being pierced by at least two lateral passageways for the escape of arc products, at least one of said passageways leading from each of said chambers and each of said passageways discharging in one general direction from the arc gap formed upon separation of said electrodes, the lateral passageway from the chamber containing said fixed electrode having a larger total effective cross-section of discharge than that of the lateral passageway from the other of said chambers, and means to drive liquid into said opening between said chambers on withdrawal of said movable electrode.

30. An electric circuit breaker, comprising in combination, a container for liquid, an insulator a switch structure supported on said insulator in said container and at least partly immersed in said liquid and formed with an internal switch chamber also containing said liquid, the wall of said switch chamber being formed with a vent outlet passage discharging laterally in one general direction from said chamber, relatively movable electrodes mounted to separate in said switch chamber, and a reaction plate insulated from said electrodes and rigidly attached to said switch structure in front of but clear of the vent outlet passage in order to counter-balance the lateral bending moment on said insulator due to the escape of arc products from said switch chamber through said outlet passage.

31. An electric circuit breaker, comprising in combination, a casing formed internally with a deep switch chamber approximating to triangular cross-section and containing liquid, and relatively movable electrodes arranged to separate in said chamber along a path closely adjacent one corner thereof, the wall of said casing in the vicinity of said path of separation being pierced by an outlet passage extending transversely from the immediate neighbourhood of the arc gap formed upon separation of said electrodes.

WILLIS BEVAN WHITNEY.
EDMUND BASIL WEDMORE.